US006961755B2

(12) United States Patent
Matsuda

(10) Patent No.: US 6,961,755 B2
(45) Date of Patent: Nov. 1, 2005

(54) INFORMATION PROCESSING APPARATUS AND METHOD, AND STORAGE MEDIUM

(75) Inventor: Kouichi Matsuda, Tokyo (JP)

(73) Assignee: Sony Corporation, Tokyo (JP)

(*) Notice: Subject to any disclaimer, the term of this patent is extended or adjusted under 35 U.S.C. 154(b) by 795 days.

(21) Appl. No.: 09/841,598

(22) Filed: Apr. 25, 2001

(65) Prior Publication Data

US 2002/0002585 A1 Jan. 3, 2002

(30) Foreign Application Priority Data

Apr. 28, 2000 (JP) ....................................... 2000-129759

(51) Int. Cl.[7] ........................ G06F 15/16; G06F 15/173

(52) U.S. Cl. ....................... 709/204; 709/206; 709/224; 709/227

(58) Field of Search ................................ 709/203–204, 709/206, 223–224, 227–228

(56) References Cited

U.S. PATENT DOCUMENTS 5,802,296 A * 9/1998 Morse et al. ............... 709/208
5,880,731 A * 3/1999 Liles et al. ................. 345/758
5,956,038 A * 9/1999 Rekimoto ................... 345/419
5,977,968 A * 11/1999 Le Blanc .................... 715/706
5,983,003 A * 11/1999 Lection et al. .............. 709/202
6,020,885 A * 2/2000 Honda ........................ 345/757
6,057,856 A * 5/2000 Miyashita et al. .......... 345/633
6,453,294 B1 * 9/2002 Dutta et al. .............. 704/270.1
6,493,001 B1 * 12/2002 Takagi et al. ............... 345/759
6,772,195 B1 * 8/2004 Hatlelid et al. ............. 709/204
6,784,901 B1 * 8/2004 Harvey et al. .............. 715/757
6,882,975 B2 * 4/2005 Yotoriyama et al. ........ 704/275

* cited by examiner

*Primary Examiner*—Saleh Najjar
*Assistant Examiner*—Sargon Nano
(74) *Attorney, Agent, or Firm*—Oblon, Spivak, McClelland, Maier & Neustadt, P.C.

(57) ABSTRACT

An information processing apparatus is disclosed which is connected to a server along with other information processing apparatuses through a network and which is supplied with a shared virtual space wherein avatars representing users remain active. The apparatus comprises a registering element for registering any of the avatars as an object to be filtered out, a filtering element for filtering out data on the avatar registered by the registering element, the data having been transmitted from the server and a processing element for processing the shared virtual space based on the data left intact following the filtering by the filtering element.

4 Claims, 16 Drawing Sheets

INFORMATION PROCESSING APPARATUS AND METHOD, AND STORAGE MEDIUM

BACKGROUND OF THE INVENTION

The present invention relates to an apparatus and a method for information processing and a storage medium for storing such a method. More particularly, the invention relates to an apparatus and a method for information processing and a storage medium for accommodating that method, whereby users represented by avatars in a shared virtual space may each remain active therein without getting annoyed with an obnoxious avatar of any other user.

There have existed personal computer network services such as NIFTY-Serve (trademark) of Japan and CompuServe (trademark) of the United State. Each of these entities allows a plurality of users to connect their personal computers through modems and over a public switched telephone network to a centrally located host computer in accordance with a predetermined communication protocol. A cyberspace service called Habitat (trademark) has been known in this field.

The development of Habitat was started in 1985 by LucasFilm Ltd. of the United States. When completed, Habitat was run by QuantumLink, a U.S. commercial network, for about three years before Fujitsu Habitat (trademark) began to be offered in Japan by NIFTY-Serve in February 1990. Habitat embraces a virtual city called "Populopolis" which, drawn in two-dimensional graphics, is inhabited by users' alter egos called avatars (incarnations of Hindu deities). Through their avatars, the users carry on between them what is known as a chat (a real-time text-based dialogue in which characters are input and read by users). More detailed information about Habitat is found in "Cyberspace: First Steps" (ed. by Michael Benedikt, 1991, MIT Press, Cambridge, Mass., ISBN0-262-02327-X, pp. 282–307).

In a conventional cyberspace system run by the above-mentioned type of personal computer network service, virtual streets as well as house interiors were described in two-dimensional graphics. For apparent movement toward the depth of a scene or back to its front side, avatars were simply moved upward or downward against a two-dimensional background. There was precious little power of expression to make users enjoy a virtual experience of walking or moving about in the virtual space. Furthermore, a given user's avatar was viewed along with other users' avatars simply from a third party's point of view in the virtual space. This was another factor detracting from the effort to let users have more impressive virtual sensory experiences.

In order to improve on such more or less unimpressive proxy experiences, there have been proposed functions which display a virtual space in three-dimensional graphics and which allow users freely to move about in the virtual space from their avatars' points of view. Such functions, disclosed illustratively in U.S. Pat. No. 5,956,038, are implemented by use of 3D graphic data in description language called VRML (Virtual Reality Modeling Language). A description of various cyberspace environments in which users may carry on chats using avatars is found in the Sep. 9, 1996 issue of Nikkei Electronics (a Japanese periodical, No. 670, pp. 151–159).

Where a plurality of avatars are set to be active in such a virtual space, the users may sometimes have squabble between them through their avatars. For example, a user B represented by an avatar "b" may criticize or annoy a user A symbolized by an avatar "a" in a text-based chat or may harass the avatar "a" illustratively by obstructing the latter's movements.

In such cases, the user B may remain stubbornly disagreeable despite admonitions through chats and harass the user A every time the latter takes part in the shared virtual space. System administrators, when alerted to the scuffle, may find it hard to take effective countermeasures.

One way to circumvent such unpleasant experiences might be to add to the system a function allowing the user A forcibly to log out the user B from the shared virtual space. But the function, if implemented, might be abused by the user B forcing the user A out of the shared virtual space.

The present invention has been made in view of the above circumstances and provides an apparatus and a method for permitting a plurality of users to remain active in a shared virtual space without getting annoyed with one another.

SUMMARY OF THE INVENTION

In carrying out the invention and according to one aspect thereof, there is provided an information processing apparatus which is connected to a server along with other information processing apparatuses through a network and which is supplied with a shared virtual space wherein avatars representing users remain active, the information processing apparatus comprising a registering element for registering any of the avatars as an object to be filtered out, a filtering element for filtering out data on the avatar registered by the registering element, the data having been transmitted from the server and a processing element for processing the shared virtual space based on the data left intact following the filtering by the filtering element.

In a preferred structure according to the invention, the information processing apparatus may further comprise a requesting element for requesting any of the other information processing apparatuses to register the avatar representing the requesting user as an object to be filtered out, wherein the registering element, in response to the request from the other information processing apparatus, registers the avatar representing the requesting user as an object to be filtered out.

According to another aspect of the invention, there is provided an information processing method for use with an information processing apparatus which is connected to a server along with other information processing apparatuses through a network and which is supplied with a shared virtual space wherein avatars representing users remain active, the information processing method comprising the steps of registering any of the avatars as an object to be filtered out, filtering out data on the avatar registered in the registering step, the data having been transmitted from the server and processing the shared virtual space based on the data left intact following the filtering in the filtering step.

According to a further aspect of the invention, there is provided a storage medium which stores a computer-readable program for use by an information processing apparatus which is connected to a server along with other information processing apparatuses through a network and which is supplied with a shared virtual space wherein avatars representing users remain active, the program comprising the steps of registering any of the avatars as an object to be filtered out, filtering out data on the avatar registered in the registering step, the data having been transmitted from the server and processing the shared virtual space based on the data left intact following the filtering in the filtering step.

Through the use of the above-outlined information processing apparatus and method as well as storage medium for storing a program representing that method, the data on any registered avatar are filtered out. With the registered avatar data filtered out, the shared virtual space is processed on the basis of the data left intact following the filtering process. This allows each of the users represented by avatars in the shared virtual space to remain active therein without getting annoyed with an obnoxious avatar of any other user.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENTS

Figure 1:
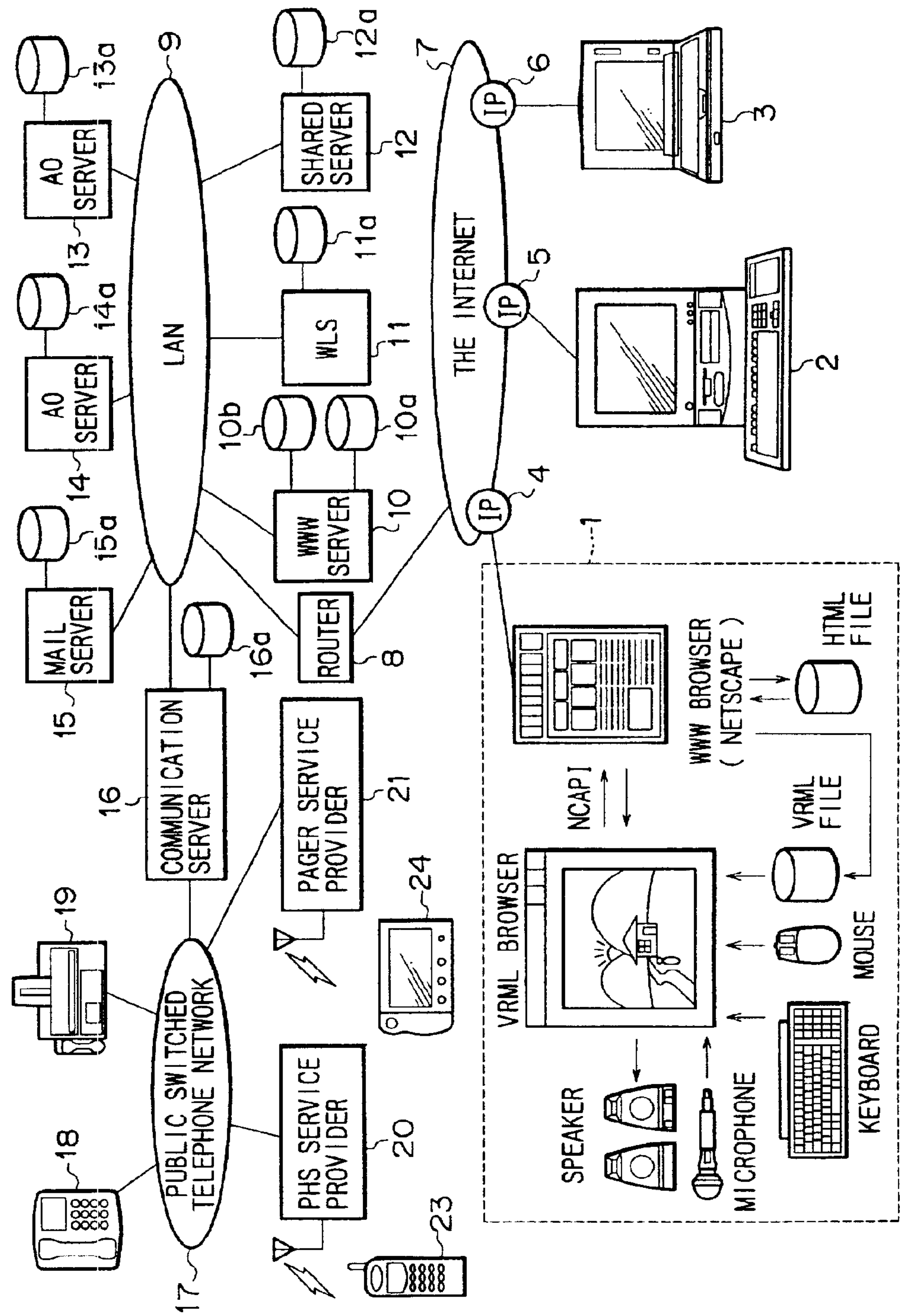
FIG. 1 is a block diagram showing a configuration of a shared virtual space offering system according to the present invention.

Preferred embodiments of the present invention will be described below with reference to the accompanying drawings.

For the moment, the description of the embodiments is preceded by an explanation hereunder of VRML (virtual reality modeling language), a description language capable of handling three-dimensional information in unified fashion through the use of a framework called WWW (World Wide Web) that offers diverse kinds of information over the Internet, a globally established computer network.

The WWW, an information offering system utilized on the Internet, was developed by CERN (European Center for Nuclear Research) in Switzerland. The system permits browsing over the network of information made up of text, images and sounds in what is known as hypertext format. Information held in WWW servers is transferred asynchronously to terminals such as personal computers in accordance with a protocol called HTTP (Hyper Text Transfer Protocol).

The WWW server is constituted by server software called an HTTP demon and by HTML files that store hypertext information. The demon signifies programs that perform management and processing in the background in a UNIX work environment. Hypertext information is expressed in description language called HTML (HyperText Markup Language). A hypertext description expresses a logical text structure enclosed by format codes "<" and ">" called tags. Description of links to other information is provided by link information called anchors. Locations of information are designated by anchors using URL (Uniform Resource Locator).

Files described in HTML are transferred over a TCP/IP (Transmission Control Protocol/Internet Protocol) network in accordance with the HTTP protocol. HTTP transfers requests from clients for information to WWW servers and sends hypertext information in HTML files back to the clients.

An environment in which to utilize the WWW is provided by client software called WWW browsers such as Netscape Navigator (trademark of Netscape Communications Corporation of the United States).

WWW browsers allow users to look up so-called websites, i.e., URL-compatible files in WWW servers located over the Internet expanded throughout the world. In what is known as net-surfing, users can hop from one website to another through links to access multitudes of WWW information sources.

Recently a new type of browsers called VRML browsers has been developed. A VRML browser permits users to access WWW servers one after another through links established in hypertext regarding objects drawn in an extended WWW format, i.e., three-dimensional graphics in a 3D space described in 3D graphics description language called VRML.

Details of VRML are described illustratively in "VRML: Browsing & Building Cyberspace" (by Mark Pesce; 1995, New Readers Publishing, ISBN 1-56205-498-8) and in "Latest Trends of VRML and CyberPassage" (articles by Koichi Matsuda and Yasuaki Honda in a Japanese periodical "bit" published by Kyoritsu Shuppan Co., Ltd., 1996; Vol. 28, No. 7, pp. 29–36; No. 8, pp. 57–65; No, 9, pp. 29–36; No. 10, pp. 49–58).

When a file described in VRML-compatible file format is transferred from a server to a user's personal computer and processed by browser, a three-dimensional virtual space is computed on the basis of VRML data. The 3D virtual space thus computed is allowed to appear on a display of the user's personal computer.

FIG. 1 is a block diagram showing an overall configuration of a shared virtual space offering system embodying the present invention.

In FIG. 1, reference numerals 1, 2 and 3 denote client PCs (personal computers) in which a VRML browser and a WWW browser are installed and active. The PCs are connected to the Internet via IP (Internet service providers) 4, 5 and 6.

A LAN (Local Area Network) 9 hooked up to the Internet 7 through a router 8 is connected with a WWW server 10, a WLS (World Location Server) 11, a shared server 12, AO (Application Object) servers 13 and 14, a mail server 15, and a communication server 16. These servers 10 through 16 are furnished with hard disk drives (HDD) 10*a*, 10*b*, 11*a* through 16*a*, respectively.

The communication server 16 is connected to telephone sets 18 and facsimile machines 19 via a public switched telephone network 17; to PHS (Personal Handyphone System) terminals 23 wirelessly via a PHS service provider 20; and to pager terminals 24 wirelessly via a pager service provider 21.

Figure 2:
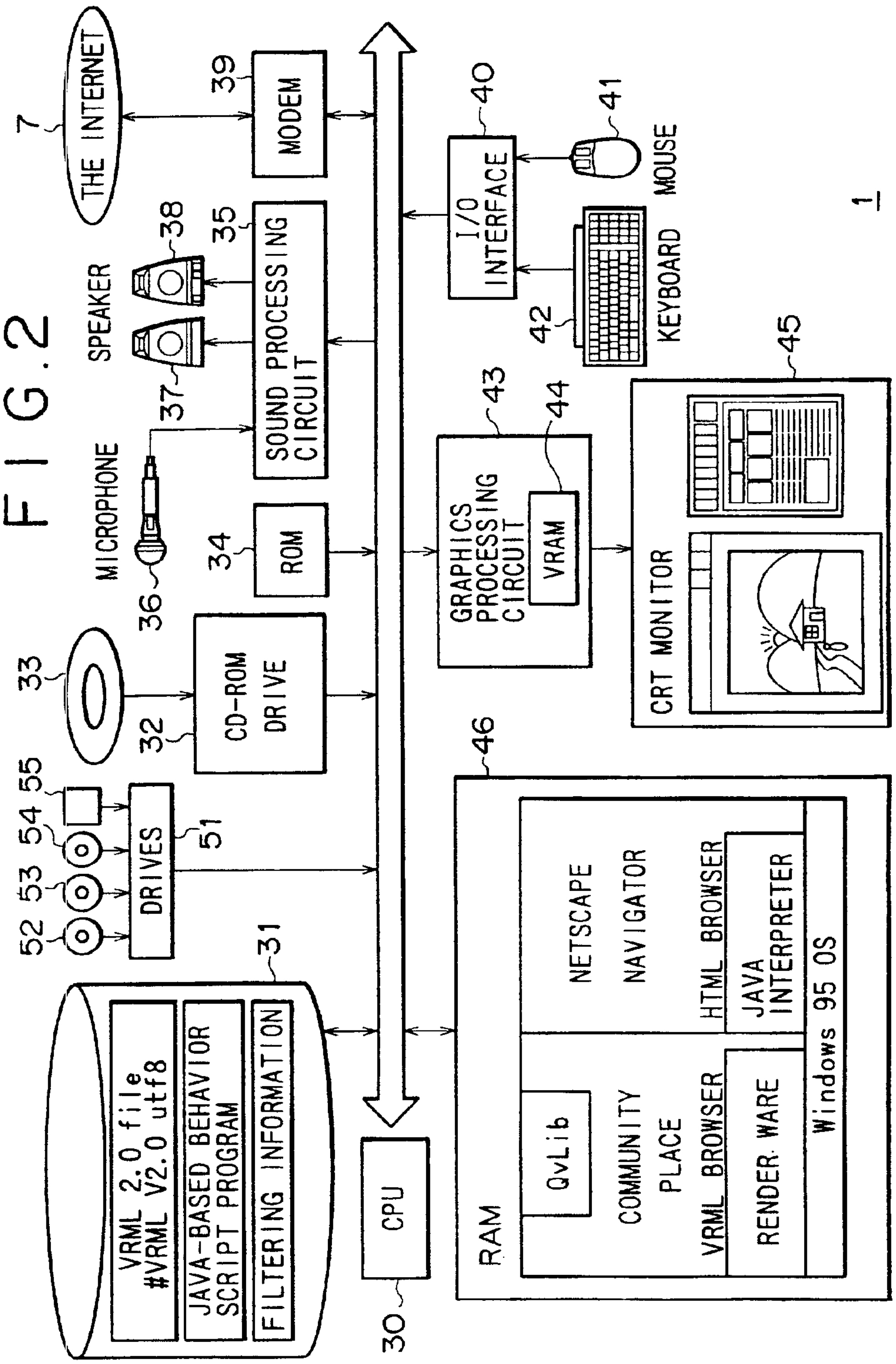
FIG. 2 is a block diagram showing a structure of a client PC in FIG. 1.

FIG. 2 is a block diagram illustrating a hardware structure of the client PC 1 shown in FIG. 1.

In FIG. 2, reference numeral 30 stands for a CPU that controls various components; 31 for a hard disk drive (HDD) that stores a VRML 2.0 file, VRML contents made up of dance script programs and a shared virtual life growth script program based on Java (trademark of Sun Microsystems, Inc. of the United States), and filtering information; 32 for a CD-ROM drive for reading the VRML contents from a CD-ROM disk 33; 34 for a ROM that stores BIOS (Basic Input Output Systems) and other resources; 35 for a sound processing circuit connected to a microphone 36 and a left-hand and a right-hand speaker 37 and 38; 39 for a modem connected to the Internet 7; 40 for an I/O (input/output) interface connected to a mouse 41 and a keyboard 42; 43 for a graphics processing circuit incorporating a VRAM 44; 45 for a CRT monitor; and 46 for a RAM.

In operation, Netscape Navigator, a WWW browser operating on Windows 95 (trademark of Microsoft Corporation of the United States); a Java interpreter; and Community Place Browser, a VRML 2.0 browser developed by Sony Corporation, are read into the RAM 46. Once placed in the RAM 46, these programs are ready to be run by the CPU 30.

The VRML 2.0 browser incorporates QvLib, i.e., a VRML parsing library (parser) developed by Silicon Graphics Inc. of the United States and offered free of charge; RenderWare, a software renderer provided by Criterion Software Ltd. of the United Kingdom; or a parser and a renderer having functions equivalent to those of the cited.

As shown in FIG. 1, Community Place Browser exchanges various data with Netscape Navigator acting as a WWW browser on the basis of NCAPI (Netscape Client Application Programming Interface; a trademark).

Netscape Navigator is fed with an HTML file and VRML contents (including a VRML file and a Java-based script program) from the WWW server 10 over the Internet 7. The received file and contents are recorded onto the local HDD 31. Netscape Navigator processes the HTML file to display text and images on the CRT monitor. Community Place Browser, on the other hand, processes the VRML file to display a 3D virtual space on the CRT monitor and varies the behaviors of objects in the 3D virtual space in keeping with the results of processing of the script programs by the Java interpreter.

Although not shown, the other client PCs 2 and 3 have the same structure as the client PC 1.

Below is a description of how the above-described embodiment of the present invention works.

As an example, it is assumed here that VRML contents are downloaded over the Internet and turned into a multi-user environment where a single virtual space is shared by a plurality of users. Typical steps constituting the processing involved are described below with reference to FIGS. 3 through 5.

Figure 3:
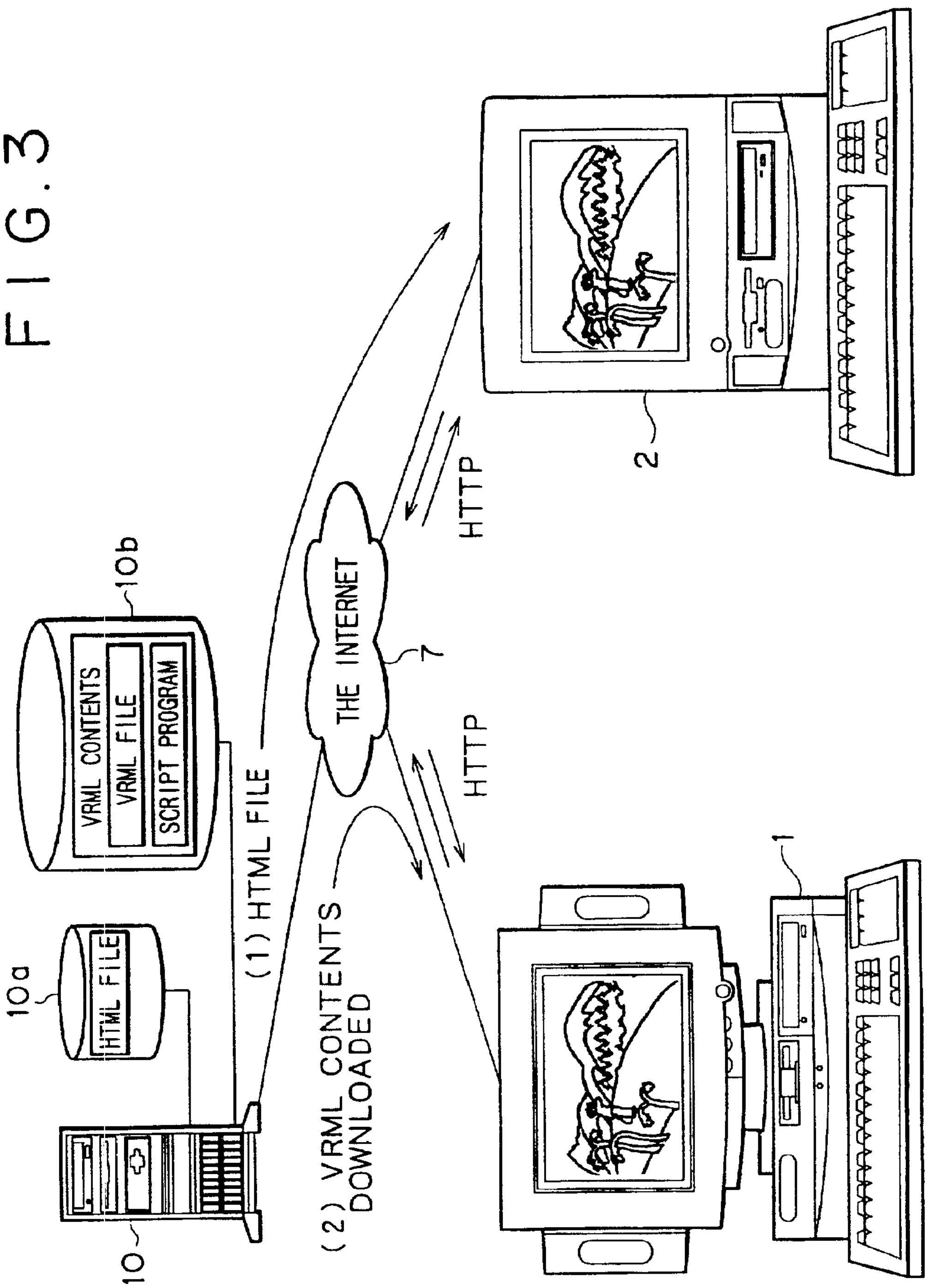
FIG. 3 is a schematic view showing a typical setup in which the system of FIG. 1 works.

In FIG. 3, as indicated by numeral (1), the WWW browser is first used to browse the home page of an website offering VRML contents. In this example, an website at http://pc.sony.co.jp/sapari/ is looked up. As pointed to by numeral (2), users of the client PCs 1 and 2 each download from the website the VRML contents made up of the VRML 2.0 file and script program (Java-based growth script program) to implement autonomous avatar behavior in a VRML space.

Obviously, the VRML contents may be provided by means of a CD-ROM disk 33 and may be read therefrom through the CD-ROM drive 32.

Figure 4:
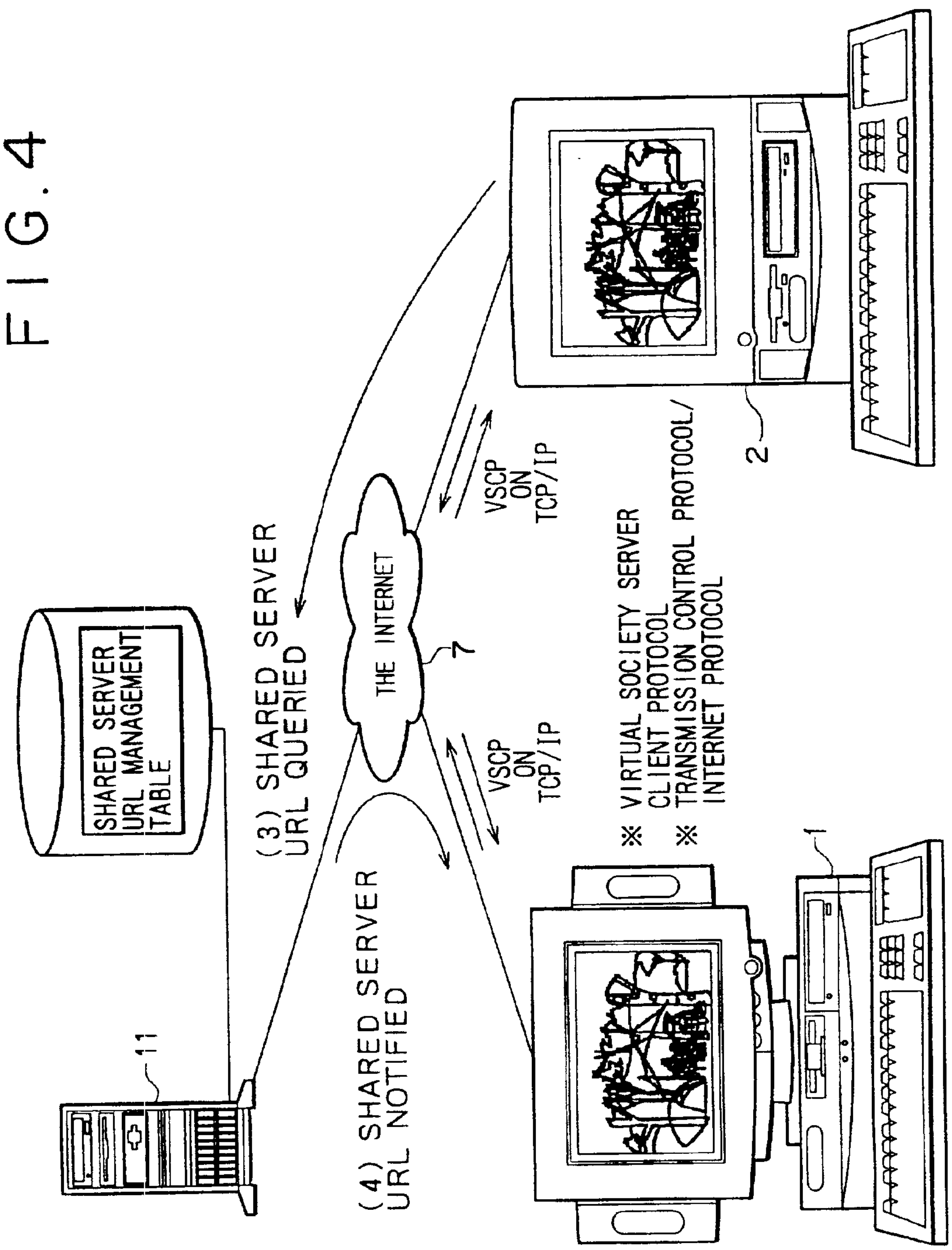
FIG. 4 is a schematic view depicting another typical setup in which the system of FIG. 1 works.

In each of the client PCs 1 and 2, as shown in FIG. 4, Community Place Browser acting as a VRML 2.0 browser interprets and executes the VRML 2.0 file that has been downloaded and stored onto the local HDD 31. As indicated by numeral (3), the browser queries the WLS 11 about a URL of the shared server 12 based on VSCP (Virtual Society Server Client Protocol). In response, as indicated by numeral (4), the WLS 11 refers to a shared server URL management table held on the HDD 11*a* and notifies the client PCs 1 and 2 of the URL of the shared server 12 retrieved from the table.

Figure 5:
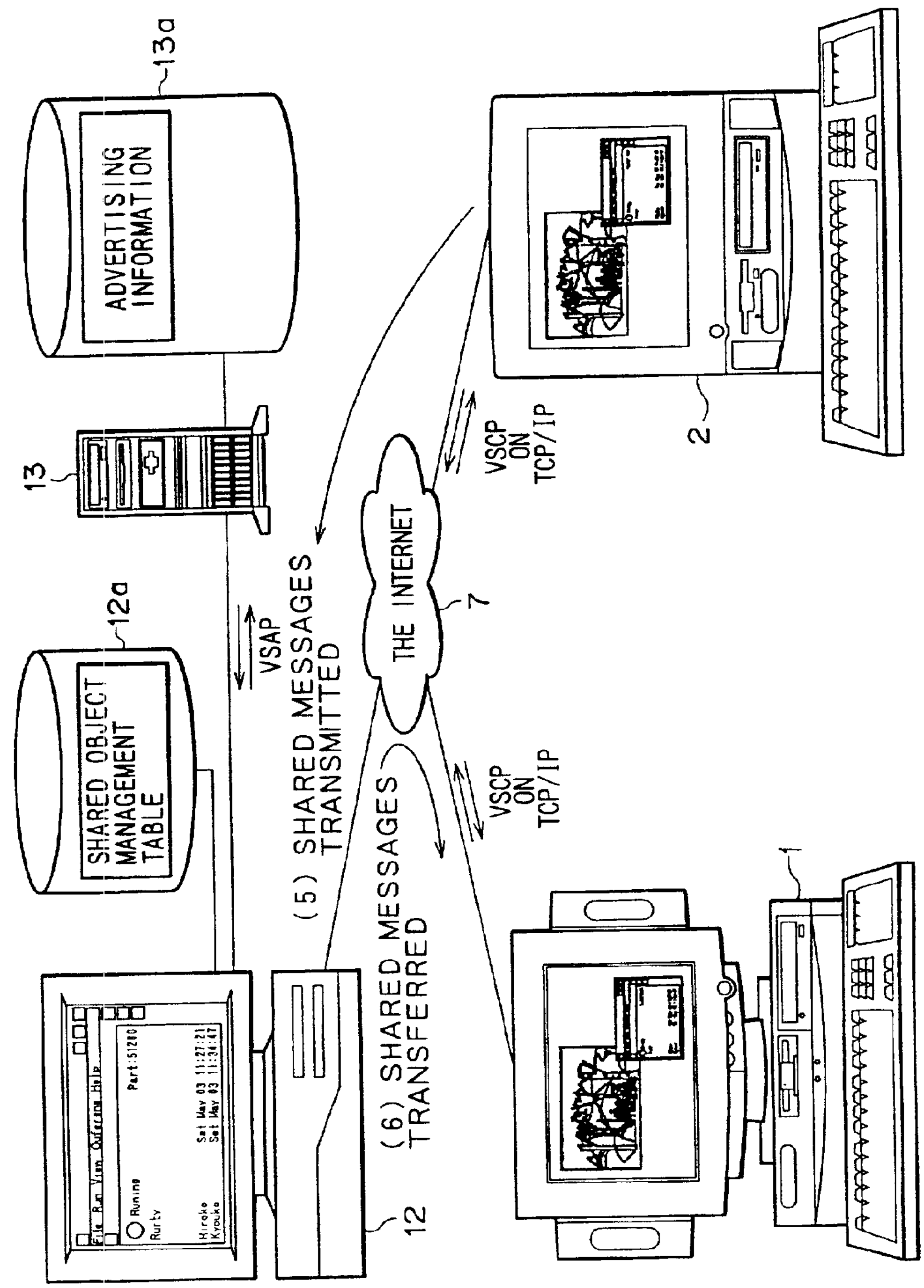
FIG. 5 is a schematic view indicating still another typical setup in which the system of FIG. 1 works.

Using the URL, the client PCs 1 and 2 link up to the shared server 12 as illustrated in FIG. 5. The linkup permits transmission of shared messages through the shared server 12 regarding locations and motions of shared 3D objects, as indicated by numeral (5). The transmission of the shared messages implements a multi-user environment, as pointed to by numeral (6).

More detailed steps for implementing the connection above are discussed in U.S. Pat. No. 5,956,038.

In the shared virtual space described above, any one of the users involved is allowed effectively to delete another avatar that has turned out obnoxious without being noticed by the offending avatar's user. This feature makes it possible for each user to remain active in the virtual space without having to put up with unpleasant scuffles with any other user's avatar. Below is a description of processes carried out to implement the feature.

If a user wants to effectively delete another user's avatar behaving in an offending manner from the shared virtual space, the offended user registers beforehand the annoying avatar as an object to be filtered out. Detailed steps constituting the registering process are shown in the flowchart of FIG. 6.

Figure 6:
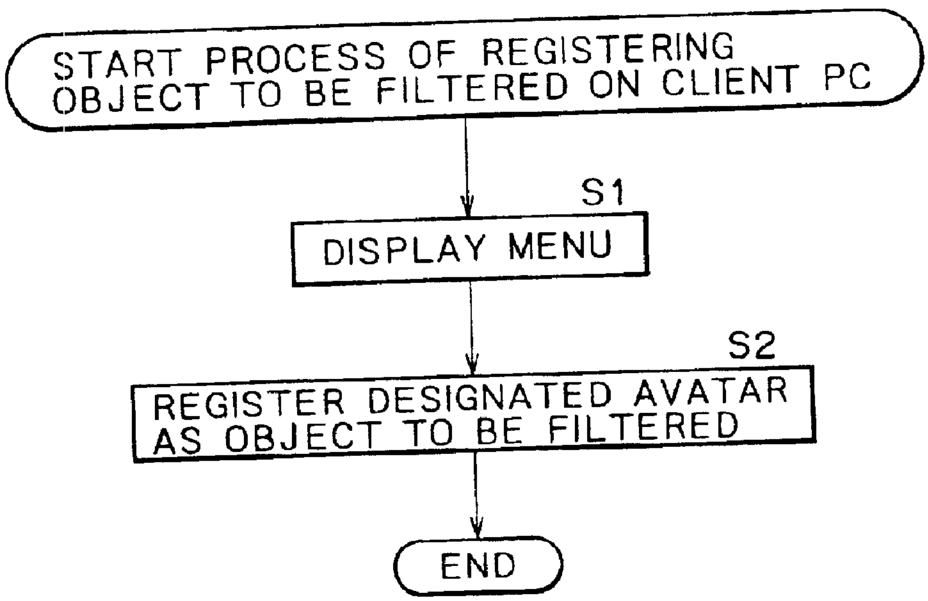
FIG. 6 is a flowchart of steps for constituting the process of registering an object to be filtered out by a client PC in FIG. 1.

In step S1 of FIG. 6, the CPU 30 of a client PC (e.g., client PC 1) waits for a menu display order to be entered by the user. Given the menu display order, the CPU 30 causes the graphics processing circuit 43 to display a filtering object registration menu on the CRT monitor 45.

Figure 7:
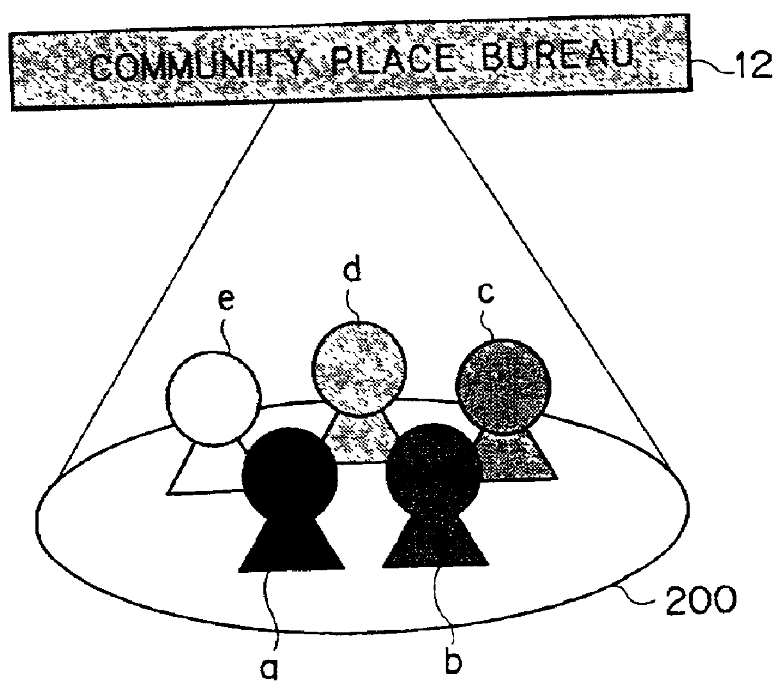
FIG. 7 is a schematic view showing how avatars typically appear in a virtual world.
Figure 8:
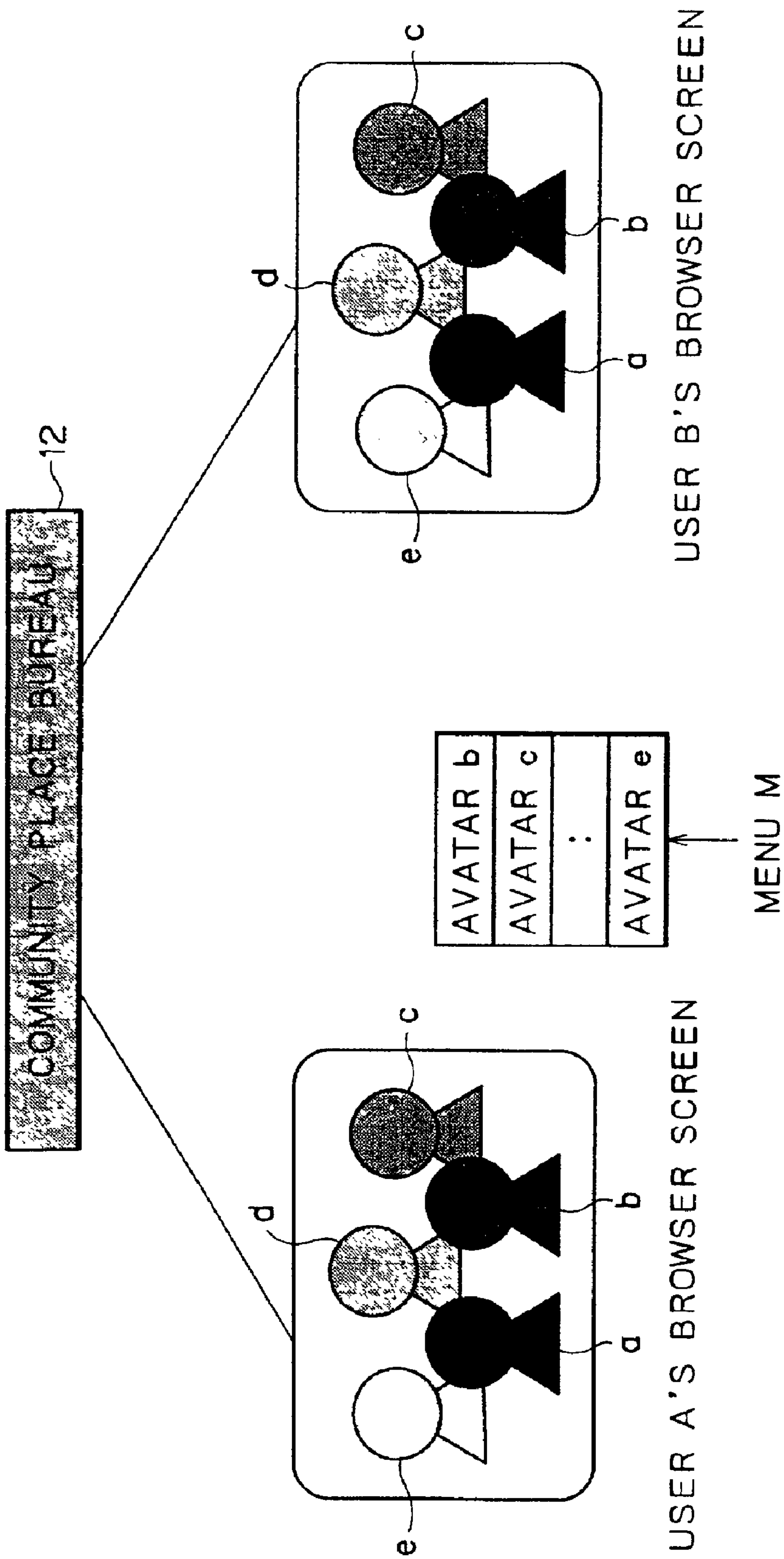
FIG. 8 is a schematic view of typical screens displayed by a user's browser.

Suppose that as shown in FIG. 7, avatars "a" through "e" are active in a virtual world 200 that is a shared virtual space. In that case, as sketched in FIG. 8, a user A's and a user B's browser screen display the avatars "a" through "e" each. If an order is given by any user to register an object to be filtered out, a list of all active avatars except the order-giving user's appears on the menu M as indicated in FIG. 8. In this example, the menu M lists the avatars "b" through "e."

Figure 9:
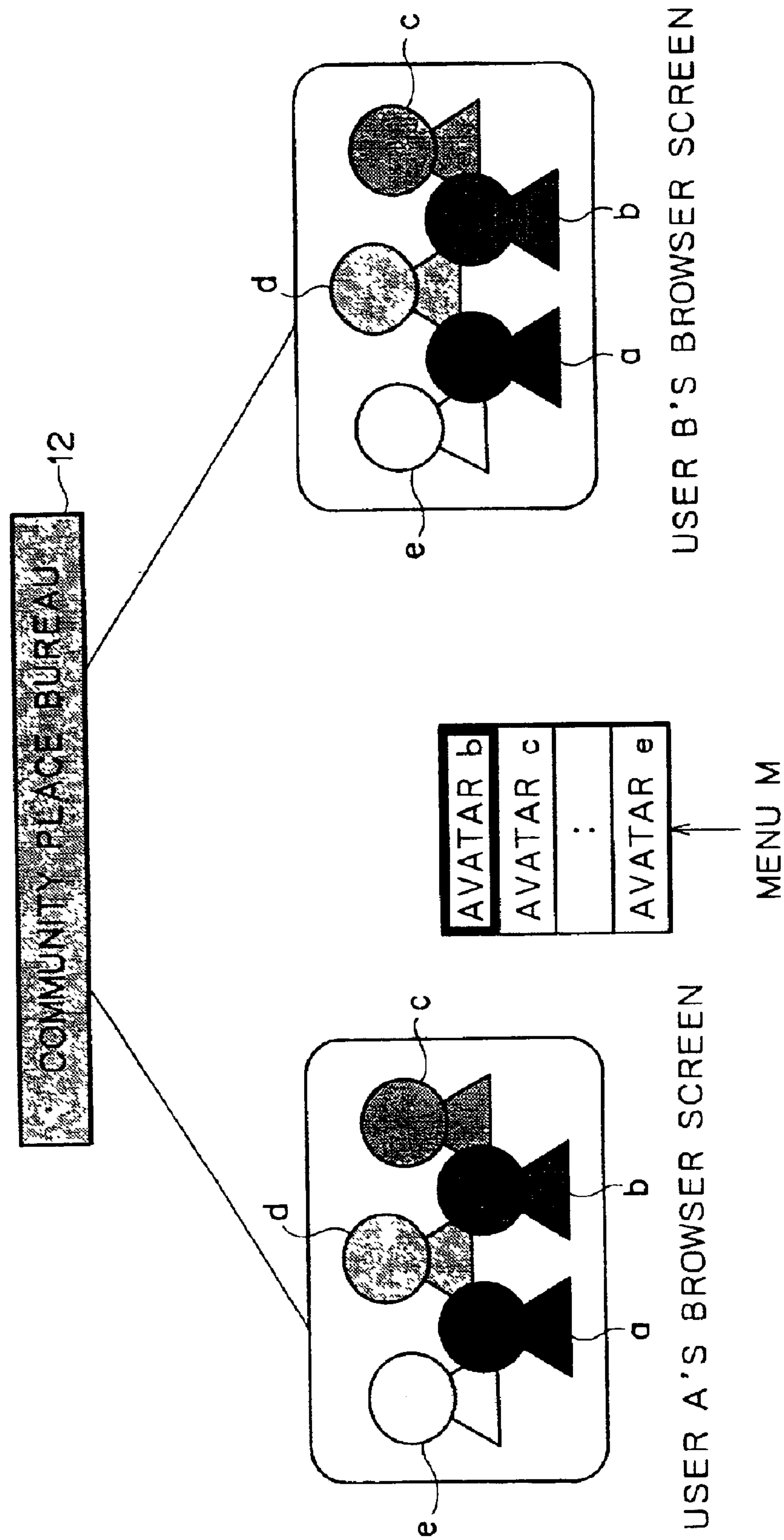
FIG. 9 is a schematic view indicating how an avatar is typically registered as an object to be filtered out.

In step S2, the CPU 30, in response to the order from the user, registers on the hard disk drive 31 a designated avatar as an object to be filtered out. As shown in FIG. 9, the user operates the keyboard 42 or mouse 41 to designate a specific avatar (e.g., avatar "b" in FIG. 9) from among the listed avatars in the menu M. In this example, the avatar "b" is registered into filtering information on the hard disk drive 41 as an object to be filtered out.

Figure 10:
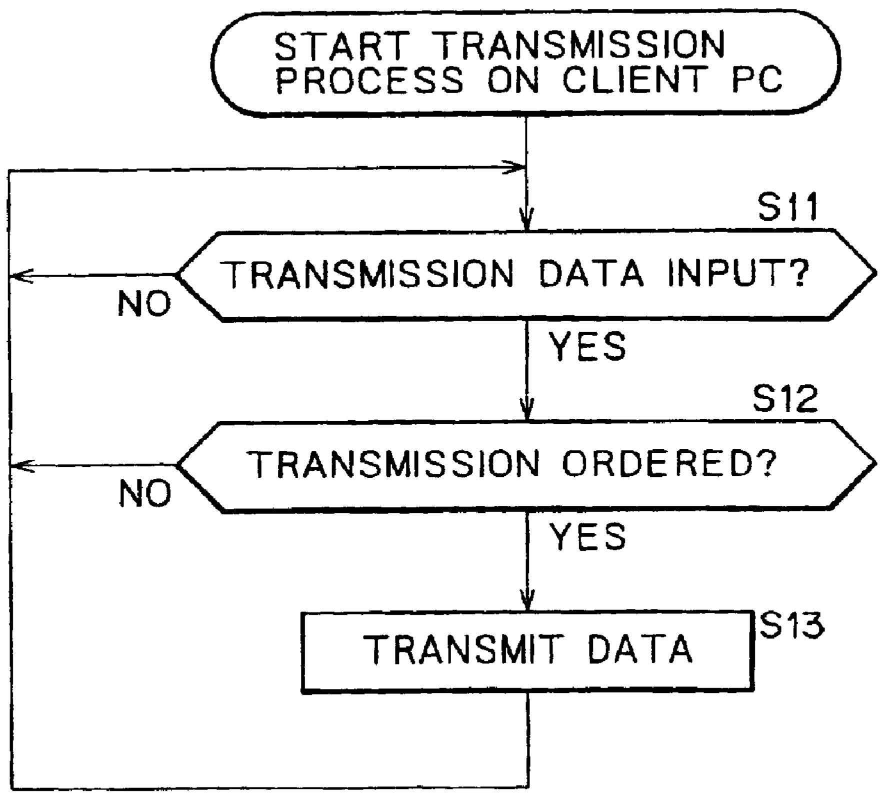
FIG. 10 is a flowchart of steps constituting a transmission process performed by a client PC in FIG. 1.

Following registration of the object to be filtered, each client PC performs its transmission process in a usual manner as depicted in FIG. 10.

In step S11, the CPU 30 waits for transmission data to be input by the user operating the mouse 41 or keyboard 42. If the user operates the mouse 41 to give an order to relocate the avatar "a," then the transmission data stand for coordinate data on the avatar "a"; if the user inputs a character string for a chat, then the transmission data signify data representing that character string.

When the transmission data are input, step S12 is reached. In step S12, the CPU 30 checks to see if a transmission order is given by the user operating the mouse 41 or keyboard 42. If no such order is judged given, step S11 is reached again and subsequent steps are repeated.

If in step S12 the transmission order is judged to be issued, step S13 is reached in which the CPU 30 carries out the process of transmitting the input data.

More specifically, the CPU 30 causes the modem 39 to forward the input data to the shared server 12 over the Internet 7.

In turn, the shared server 12 transmits the data to the other client PCs over the Internet 7.

Figure 11:
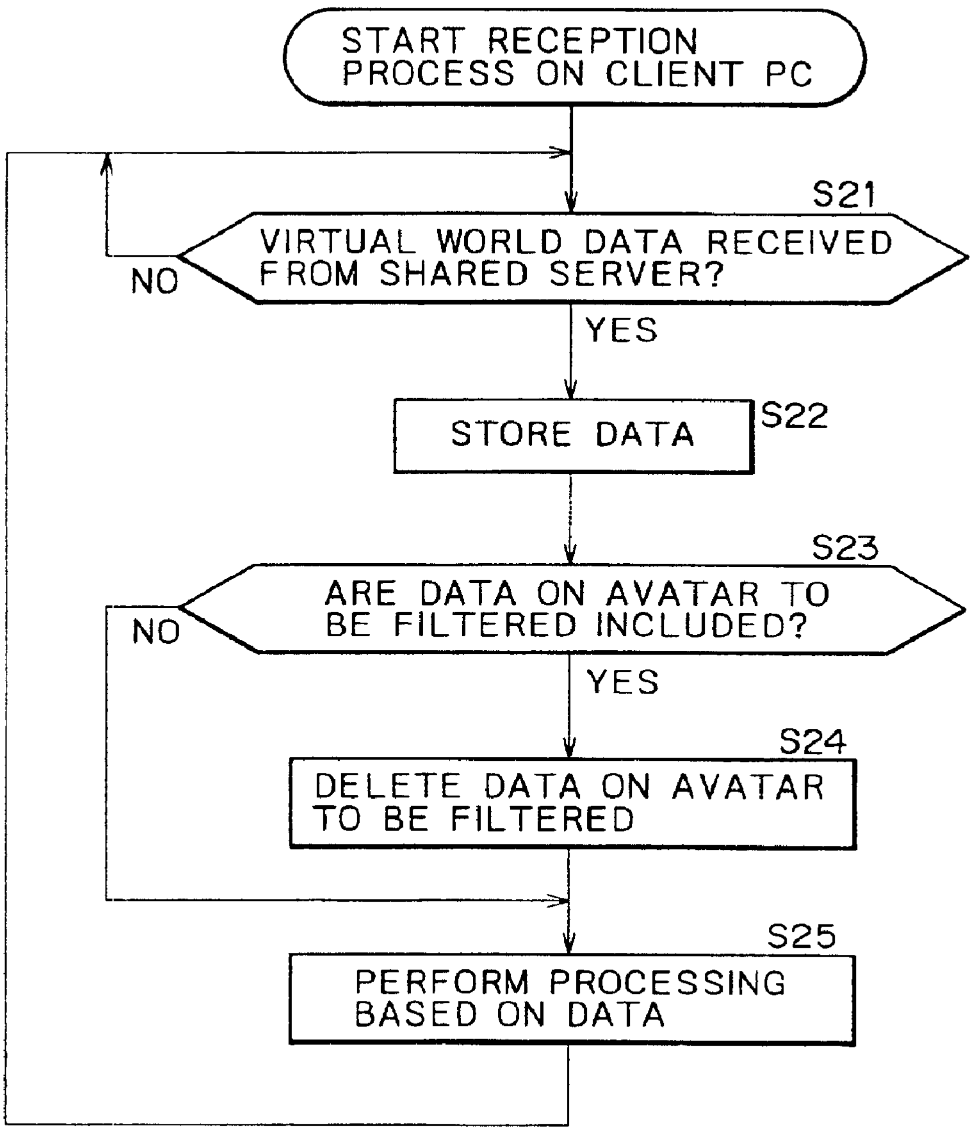
FIG. 11 is a flowchart of steps constituting a reception process performed by a client PC in FIG. 1.

On receiving the data from the shared server 12, each client PC carries out steps shown in the flowchart of FIG. 11.

In step S21 of FIG. 11, the CPU 30 of, say, the client PC 1 waits for data about the virtual world (i.e., shared virtual space) to arrive from the shared server 12. Upon receipt of the virtual world data, step S22 is reached in which the CPU 30 stores the received data onto the hard disk drive 31.

In step S23, the CPU 30 checks to see whether the data received from the shared server 12 and stored on the hard disk include data representative of any avatar as an object to be filtered out. In this example, the avatar "b" is found registered on the hard disk drive 31 as the object to be filtered out. With the data in question thus judged included, step S24 is reached. In step S24, the CPU 30 deletes from the stored data the data on the avatar "b" to be filtered. The process in step S24 of deleting avatar data is skipped if the stored data do not include data on any avatar as an object to be filtered out.

In step S25, the CPU 30 carries out a predetermined process based on the data left intact following the filtering. The process performed here may be that of redrawing images of the virtual world 200 or of displaying a chat character string.

Thereafter, step S21 is reached again and subsequent steps are repeated.

Figure 12:
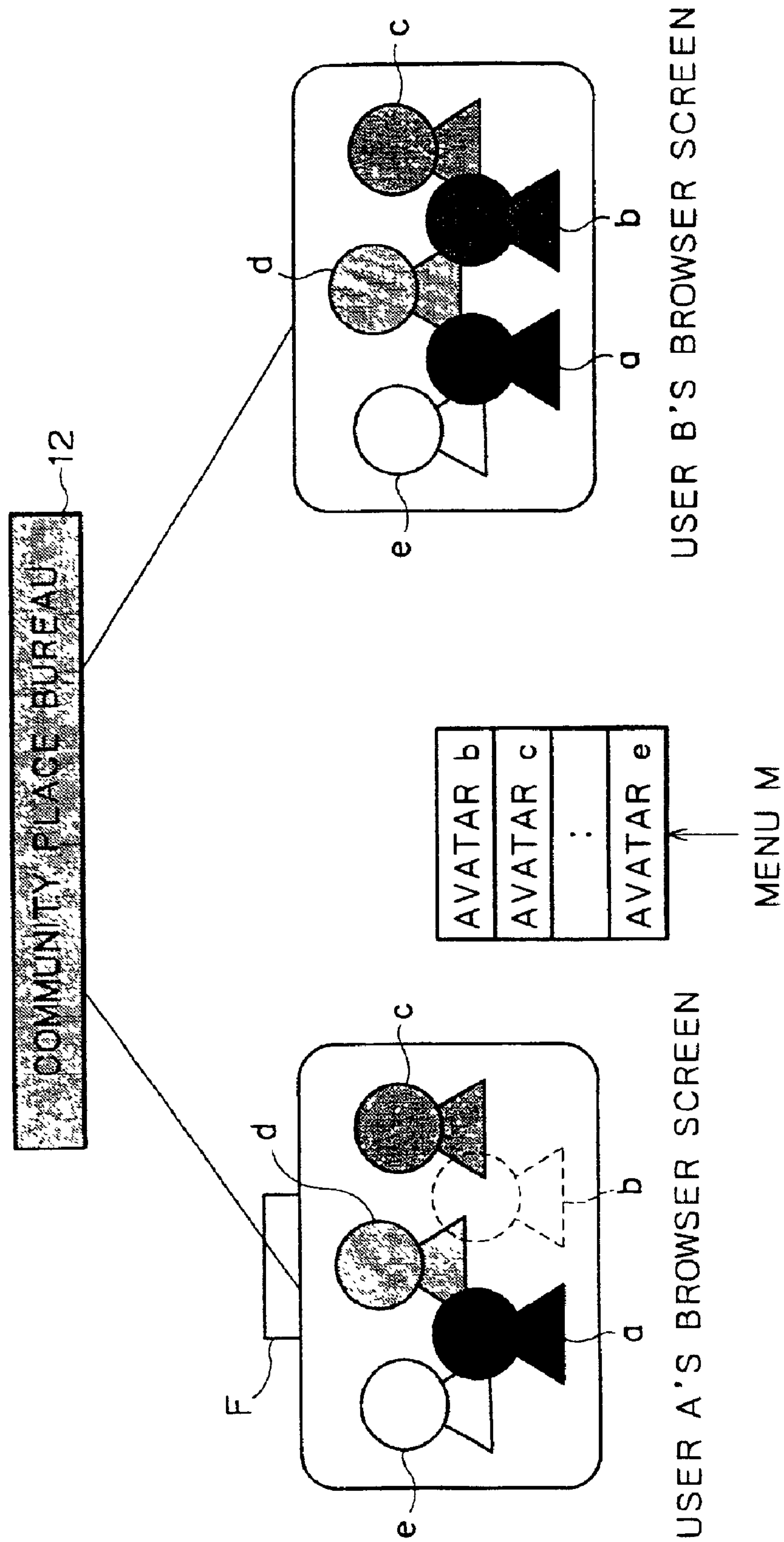
FIG. 12 is a schematic view of typical images that appear after an avatar has been registered as an object to be filtered out.

When the filtering is effected as described above, the data sent from a community place bureau of the shared server 12 are admitted into the user A's browser through a filter F as shown in FIG. 12. The filter F filters out the data on the avatar "b" registered as the object to be filtered out. The filtering process causes the avatar "b" to disappear from the screen of the virtual world 200 displayed by the user A's browser, as sketched in FIG. 12.

Figure 13:
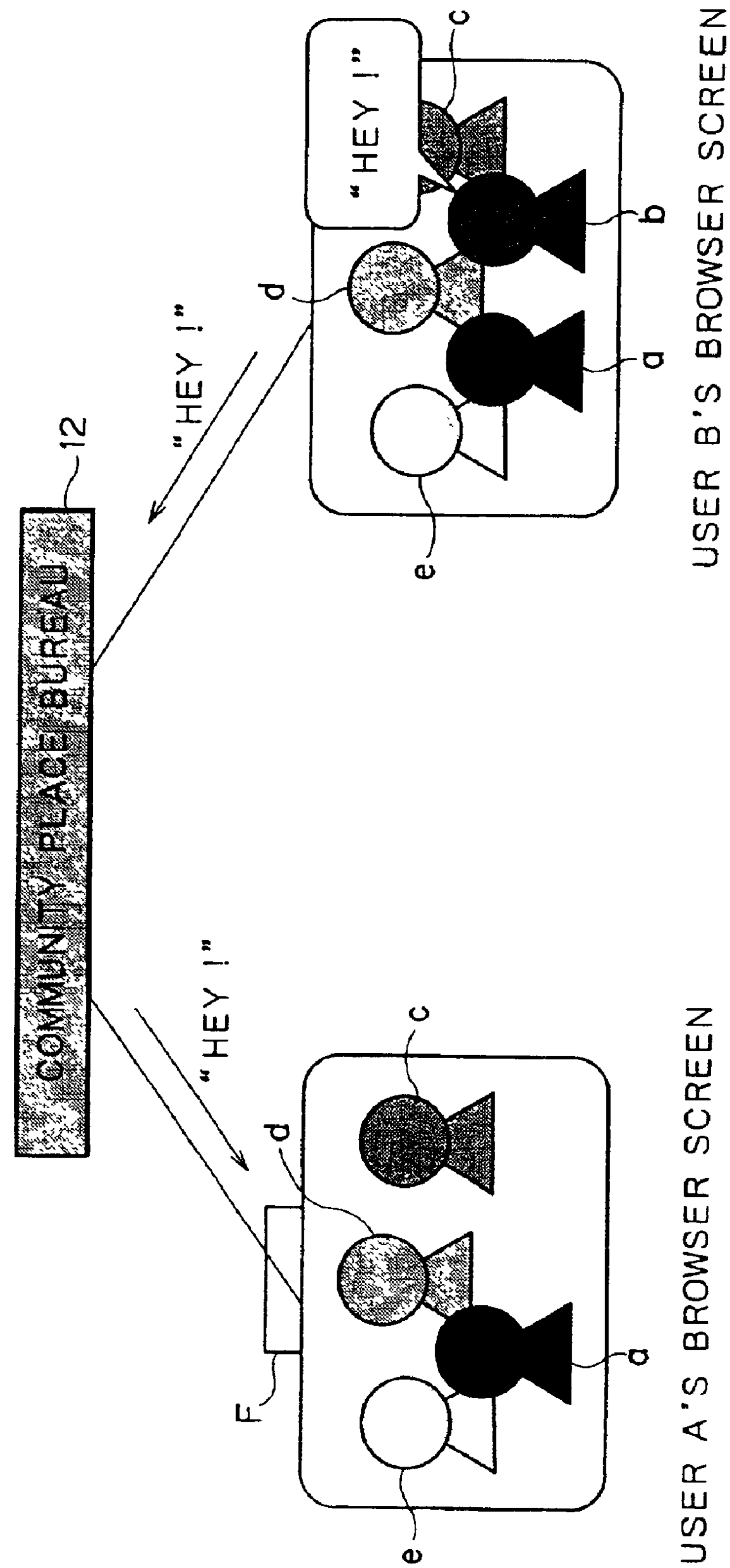
FIG. 13 is a schematic view showing how a character string is transferred when an avatar is registered as an object to be filtered out.

Thereafter, as shown in FIG. 13, if the user B represented by the avatar "b" outputs a chat message "Hey!" to the user A symbolized by the avatar "a," the chat data are forwarded by the community place bureau of the shared server 12 to the user A's client PC. The filter F in the user A's browser deletes any data on the avatar "b" and thereby prevents the character string "Hey!" from appearing in the user A's browser screen.

Figure 14:
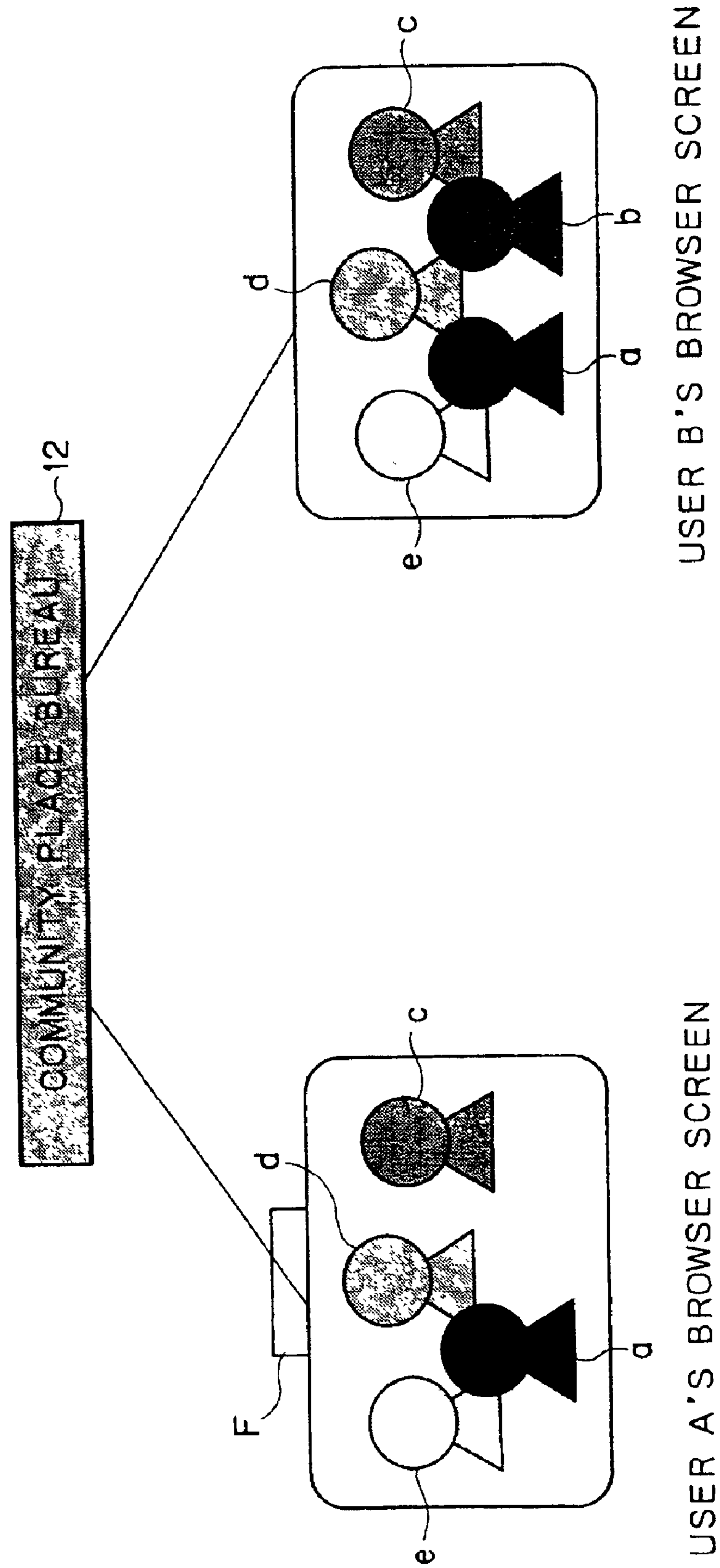
FIG. 14 is a schematic view of a virtual world that emerges when an avatar is registered as an object to be filtered out.

Consequently, as shown in FIG. 14, although the avatar "a" appears on the browser screen of the user B represented by the avatar "b," the browser screen of the user A symbolized by the avatar "a" shows no sign of the avatar "b." The user A then lets the avatar "a" remain active in the virtual world 200 where the avatar "b" is practically eliminated from the user A's point of view.

In the above example, the avatar "b" does not appear on the user A's browser screen but the avatar "a" appears on the user B's browser screen. Alternatively, it is possible to make the avatar "a" also disappear from the browser screen of the user B. This feature is implemented by the processes of the flowcharts in FIGS. 15 and 16.

Figure 15:
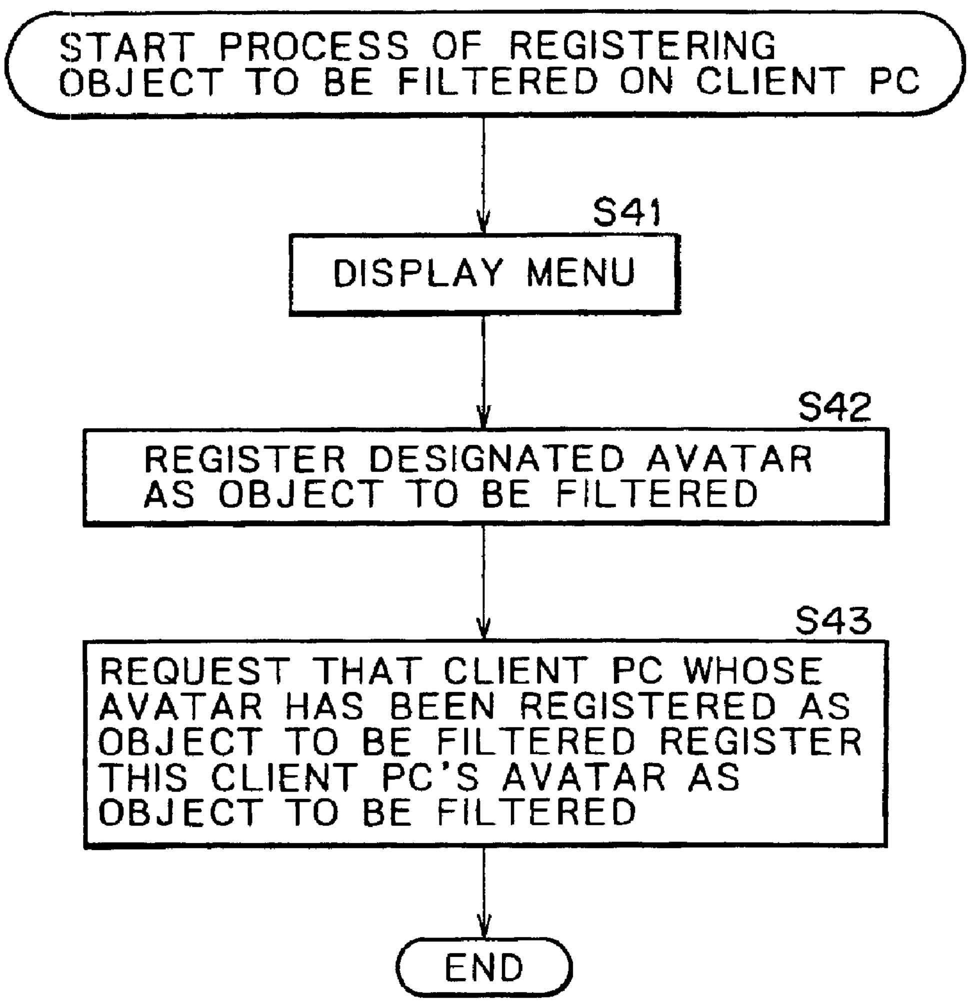
FIG. 15 is a flowchart of steps constituting a process of registering another object to be filtered out by a client PC in FIG. 1.

FIG. 15 shows the steps constituting the process of registering another object to be filtered out by a client PC. Steps S41 and S42 in FIG. 15 are identical to steps S1 and S2 in FIG. 6, respectively. These steps when carried out cause the menu to appear and allow a designated avatar to be registered as an object to be filtered out.

In the example of FIG. 15, step S43 is carried out to effect a process whereby a client PC (e.g., client PC 2 of the user B) whose avatar (e.g., avatar "b") was registered in step S42 as an object to be filtered out is requested to register the avatar (e.g., avatar "a") of the requesting user as another object to be filtered out. In other words, when the user A represented by the avatar "a" registers the avatar "b" as an object to be filtered out, the CPU 30 in the client PC 1 of the avatar "a" requests via the Internet 7 the client PC 2 of the avatar "b" to register the avatar "a" as another object to be filtered out.

Figure 16:
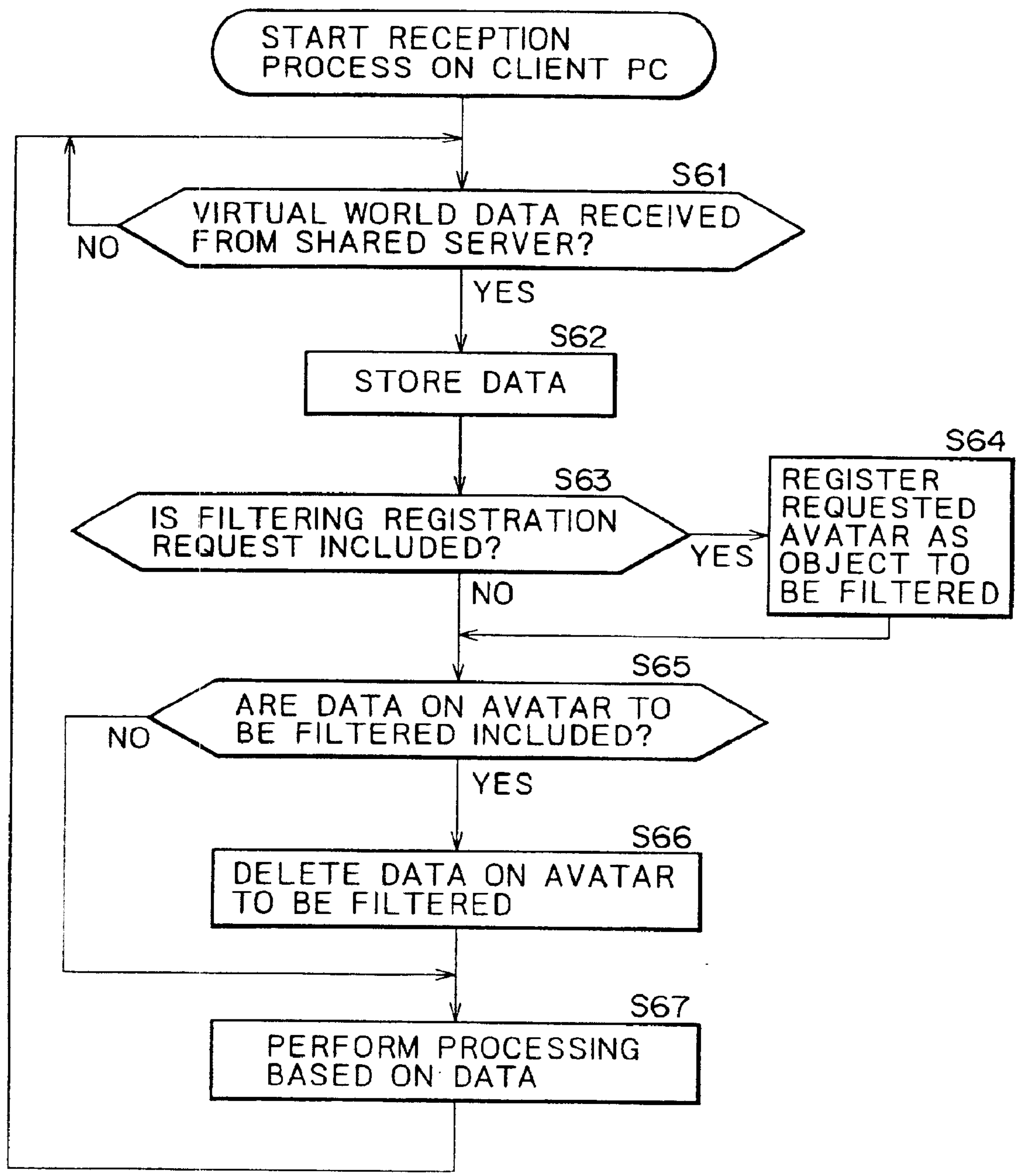
FIG. 16 is a flowchart of steps constituting a reception process performed by the client PC in connection with the process of FIG. 15.

FIG. 16 shows the steps constituting the reception process performed by a client PC (e.g., client PC 2) in connection with the process of filtering object registration in FIG. 15. The process of FIG. 16 is partially the same as that of FIG. 11 ranging from steps S21 to S25. In step S61 of FIG. 16, a check is made to see if virtual world data have been received from the shared server 12. If such data are judged to be received, step S62 is reached in which the received data are stored onto the hard disk drive 31. In step S63, the CPU 30 checks to see if the received and stored data contain a filtering registration request that may be output in step S43 of FIG. 10.

If in step S63 the filtering registration request is judged to be included in the data, step S64 is reached. In step S64, the CPU 30 registers the requested avatar (avatar "a" in this case) as an object to be filtered out. That is, the same process as that of step S42 in FIG. 15 is carried out by the client PC 2 side associated with the avatar "b."

The process of object registration for filtering in step S64 is skipped if no filtering registration request is judged included in the received data in step S63.

In step S65, the CPU 30 checks to see if the data received and stored in step S62 contain data representing an avatar as an object to be filtered out. Illustratively, if the data on the avatar "a" are transferred, the avatar "a" is registered as the object to be filtered out in step S64. In that case, step S65 is followed by step S66 in which the CPU 30 in the client PC 2 of the avatar "b" deletes from the stored data the data concerning the avatar "a" (i.e., the avatar registered as the object to be filtered out). Step S66 is skipped if any data on an avatar to be filtered out are judged absent in the stored data in step S65.

In step S67, the CPU 30 carries out a predetermined process based on the data left intact following the deletion of the data on the avatar to be filtered out.

Figure 17:
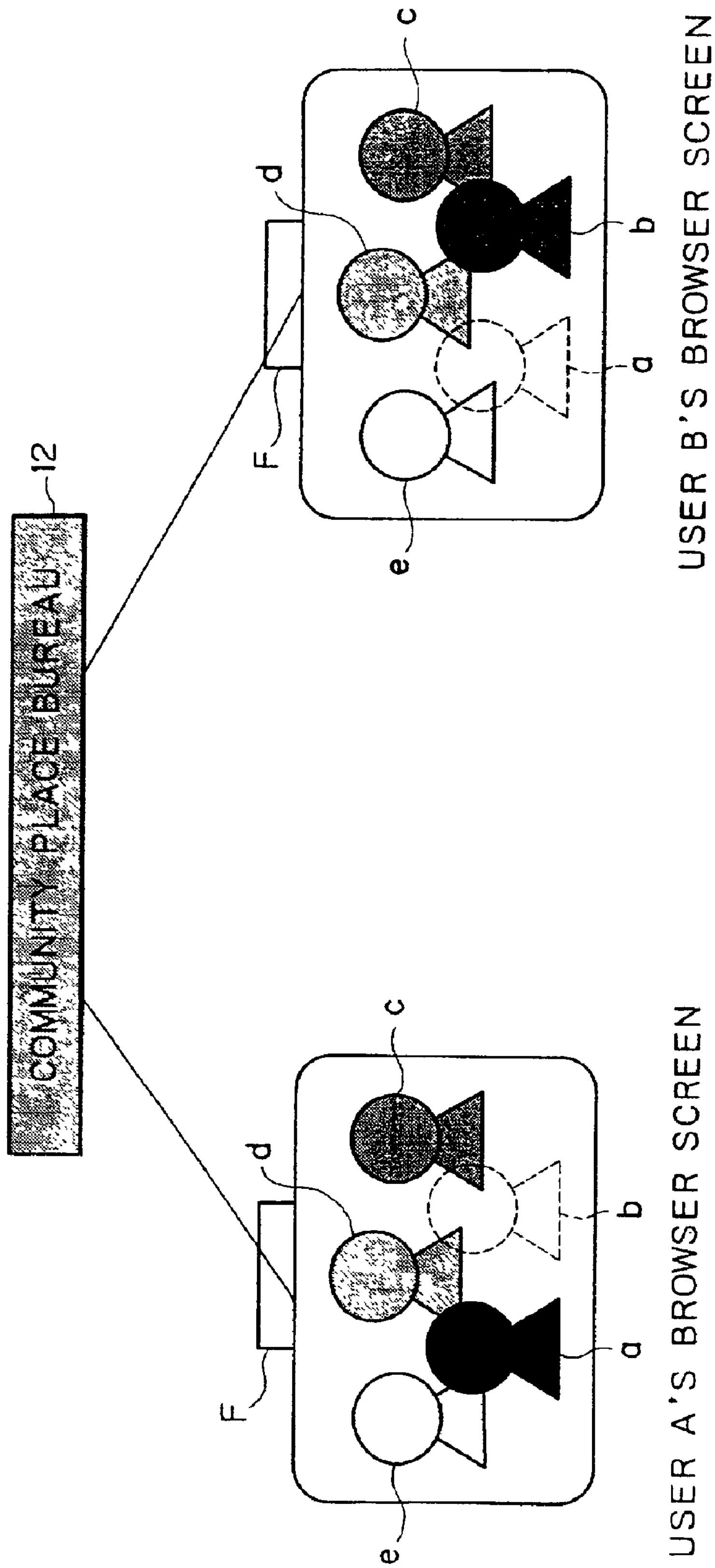
FIG. 17 is a schematic view of a virtual world that emerges as a result of the processes in FIGS. 15 and 16.

In the above setup, as shown in FIG. 17, not only the user A's browser screen shows no sign of the avatar "b," but also the user B's browser screen does not display the avatar "a." In this case, the filter F is provided in both the user A's and the user B's browser.

Although images in the shared virtual space have been described above as generated on the side of client PCs, this is not limitative of the invention; these images may be generated alternatively by the shared server 12. The alternative setup, however, tends to increase burdens on the shared server 12 as the number of client PCs connected to the server 12 grows. Under the circumstances, it is preferable for the client PCs to take on the processing involved.

The series of steps described above may be executed either by hardware or by software. For software-based processing to take place, programs constituting the software may be installed upon use from the Internet 7 or from a suitable program storage medium into the client PCs 1, 2 and 3 and the shared server 12.

As shown in FIG. 2, the program storage medium is offered to users apart from computers not only as a package medium constituted by an optical disk 52 (including DVD (digital versatile disk) apart from the program-recorded CD-ROM 33), a magnetic disk 53 (including floppy disks), a magneto-optical disk 54 (including MD (Mini-disk)), or a semiconductor memory 55, any of them loaded into a drive 51; but also in the form of the ROM 34 or the hard disk drive 31 which contains the programs and which are incorporated beforehand in the client PC 1 and shared server 12.

In this specification, the steps which are preserved on a program storage medium and which describe the programs to be executed represent not only processes that are carried out in the depicted sequence (i.e., on a time series basis) but also those that are conducted parallelly or individually.

In this specification, the term "system" refers to an entire configuration made up of a plurality of component devices.

As many apparently different embodiments of this invention may be made without departing from the spirit and scope thereof, it is to be understood that the invention is not limited to the specific embodiments thereof except as defined in the appended claims.

What is claimed is:

1. An information processing apparatus which is configured for connection to a server along with other information processing apparatuses through a network and which is supplied with a shared virtual space wherein avatars representing users remain active, said information processing apparatus comprising:

a registering unit configured to register any of said avatars as an object to be filtered out in a predetermined storage area;

a receiving unit configured to receive data corresponding to said shared virtual space from said server;

a determining unit configured to determine whether said received data includes data representative of any avatar as an object to be filtered out;

a filtering unit configured to delete the data to be filtered out from said received data; and a processing unit configured to process said shared virtual space based on data left intact following the filtering by said filtering unit.

2. An information processing apparatus according to claim 1, further comprising a requesting mechanism configured to request any of said other information processing apparatuses to register the avatar representing the requesting user as an object to be filtered out;

wherein said registering mechanism, in response to the request from the other information processing apparatus, registers the avatar representing the requesting user as an object to be filtered out.

3. An information processing method for use with an information processing apparatus which is configured for connection to a server along with other information processing apparatuses through a network and which is supplied with a shared virtual space wherein avatars representing users remain active, said information processing method comprising the steps of:

registering any of said avatars as an object to be filtered out;

receiving data corresponding to said shared virtual space sent from said server;

determining whether said received data includes data representative of any avatar as an object to be filtered out;

filtering out data on the avatar registered in said registering step, said data having been transmitted from said server; and processing said shared virtual space based on the data left intact following the filtering in said filtering step.

4. A storage medium which stores a computer-readable program for use by an information processing apparatus which is configured for connection to a server along with other information processing apparatuses through a network and which is supplied with a shared virtual space wherein avatars representing users remain active, the program comprising the steps of:

registering any of said avatars as an object to be filtered out;

receiving data corresponding to said shared virtual space sent from said server;

determining whether said received data includes data representative of any avatar as an object to be filtered out;

filtering out data on the avatar registered in said registering step, said data having been transmitted from said server; and processing said shared virtual space based on the data left intact following the filtering in said filtering step.

* * * * *